United States Patent [19]

Kim et al.

[11] Patent Number: 5,376,828
[45] Date of Patent: Dec. 27, 1994

[54] SHUNT CONNECTED SUPERCONDUCTING ENERGY STABILIZING SYSTEM

[75] Inventors: Sang H. Kim, Madison; Paul F. Koeppe, Cross Plains; Carel C. DeWinkel, Madison, all of Wis.

[73] Assignee: Superconductivity, Inc., Middleton, Wis.

[21] Appl. No.: 62,709

[22] Filed: May 14, 1993

Related U.S. Application Data

[63] Continuation of Ser. No. 724,409, Jul. 1, 1991, abandoned.

[51] Int. Cl.$^5$ .............................. H02J 3/04; H02J 9/06
[52] U.S. Cl. .................................... 307/64; 307/22; 307/26
[58] Field of Search .................................... 307/19–26, 307/29, 43–48, 64–68, 86, 87; 361/19–21, 141; 318/150, 161; 323/267, 360; 363/14, 34, 35, 37

[56] References Cited

U.S. PATENT DOCUMENTS

| | | | |
|---|---|---|---|
| 2,088,040 | 7/1937 | Simons et al. | |
| 2,194,822 | 3/1940 | Dannheiser | |
| 2,913,881 | 11/1959 | Garwin | 62/3 |
| 2,987,631 | 6/1961 | Park, Jr. | |
| 3,019,354 | 1/1962 | Anderson et al. | |
| 3,143,720 | 8/1964 | Rogers | 336/155 |
| 3,243,654 | 3/1966 | Wright | 315/289 |
| 3,267,306 | 8/1966 | Hassel et al. | 307/149 |
| 3,275,843 | 9/1966 | Meyerhoff | |
| 3,292,021 | 12/1966 | Hoag | 310/40 |
| 3,339,080 | 8/1967 | Howald | 307/66 |
| 3,365,652 | 1/1968 | Schwebel | 322/2 |
| 3,443,128 | 5/1969 | Fakan | 310/10 |
| 3,479,569 | 11/1969 | Prost et al. | |
| 3,562,684 | 2/1971 | Sole | 355/216 |
| 3,611,114 | 10/1971 | Sole | |
| 3,671,902 | 6/1972 | Westendorp | 336/84 |
| 3,701,906 | 10/1972 | Denel et al. | 307/149 |
| 3,800,256 | 3/1974 | Garwin | 335/216 |
| 3,866,110 | 2/1975 | Ruggeri | 322/57 |
| 3,956,727 | 5/1976 | Wolf | 338/32 S |
| 4,032,959 | 6/1977 | Boom et al. | 323/44 F |
| 4,079,305 | 3/1978 | Peterson et al. | 363/27 |
| 4,082,991 | 4/1978 | Constant | 320/1 |
| 4,122,512 | 10/1978 | Peterson et al. | 363/14 |
| 4,135,127 | 1/1979 | Khanna et al. | 323/44 F |
| 4,195,334 | 3/1980 | Perry et al. | 363/44 |
| 4,222,004 | 9/1980 | Abramian | 323/44 F |

(List continued on next page.)

*Primary Examiner*—A. D. Pellinen
*Assistant Examiner*—Richard T. Elms
*Attorney, Agent, or Firm*—McAndrews, Held & Malloy, Ltd.

[57] ABSTRACT

A shunt connected energy stabilizing system with isolation switching for providing stored energy to loads or to a utility or industrial electrical distribution system or source of electrical power. An energy backup and recovery system stores energy in a superconducting magnet and releases the energy to a real power/reactive power (VARs) generator which in turn delivers energy to either the loads or to both the loads and the source of electrical power. During periods of voltage sag or power outage, an isolation switch provides a way for isolating the loads from the source of power so that energy can be supplied to the loads only to provide "ride-thru". In effect, the isolation of the load sheds this load from the power system, thereby boosting the rest of the electrical distribution to a level so that other loads on the power system are not disturbed by the voltage sags. By supplying energy to the loads only, small superconducting magnets can be used thereby providing economic and size advantages. The isolation switch also provides a smooth transition from the real power generation to the VAR compensation mode, and vice versa. Additionally, the isolation switch can direct stored energy to both the electrical system and to the loads at the same time.

24 Claims, 4 Drawing Sheets

U.S. PATENT DOCUMENTS

| | | | |
|---|---|---|---|
| 4,251,735 | 2/1981 | Coleman | 307/46 |
| 4,336,561 | 6/1982 | Murphy | 361/19 |
| 4,348,630 | 9/1982 | Boenig et al. | 323/207 |
| 4,414,461 | 11/1983 | Wolf | 219/121 L |
| 4,431,960 | 2/1984 | Zucker | 323/340 |
| 4,438,474 | 3/1984 | Paice | 361/58 |
| 4,464,617 | 8/1984 | Yantovsky et al. | 318/717 |
| 4,488,198 | 12/1984 | Christen et al. | 361/20 |
| 4,493,014 | 1/1985 | Higashino | 363/14 |
| 4,532,445 | 7/1985 | Iwamoto et al. | 310/52 |
| 4,577,126 | 3/1986 | Mailfert | 310/52 |
| 4,584,518 | 4/1986 | Higashino et al. | 323/224 |
| 4,599,519 | 7/1986 | Boenig | 307/22 |
| 4,609,831 | 9/1986 | Higashino et al. | 307/270 |
| 4,642,503 | 2/1987 | Ueda et al. | 310/214 |
| 4,695,932 | 9/1987 | Higashino | 363/14 |
| 4,707,142 | 11/1987 | Baker et al. | 368/46 |
| 4,707,774 | 11/1987 | Kajita | 363/37 |
| 4,709,314 | 11/1987 | van de Klundert et al. | 363/14 |
| 4,754,161 | 6/1988 | Fox | 307/87 |
| 4,937,462 | 6/1990 | Recker et al. | 307/19 |
| 4,962,354 | 10/1990 | Visser et al. | 323/360 |
| 5,041,959 | 8/1991 | Walker | 363/79 |
| 5,160,911 | 11/1992 | Herring | 335/216 |

SHUNT CONNECTED SUPERCONDUCTING ENERGY STABILIZING SYSTEM

This is a continuation of Ser. No. 724,409 filed on Jul. 1, 1991 now abandoned.

BACKGROUND OF THE INVENTION

1. Field of the Invention

This invention relates to a shunt connected superconducting energy stabilizing system with isolation switching for providing energy to an AC or DC load or loads and/or to a source of electrical power. In particular, the invention relates to a superconducting stabilizing system providing energy to the loads, during voltage sags or momentary losses of power, while an isolation switch disconnects the loads from the source of power. In addition, the superconducting energy stabilizing system can supply energy to both the loads and to the source at the same time until the source of electrical power recovers from the energy sag or momentary loss of power.

2. Background of the Prior Art

Prior art superconducting energy storage systems have been directed to the storage of energy derived from an alternating current (AC) power system and to the return of the stored energy to the AC power system. Typically energy is stored during periods of low energy demand when surplus energy exists and is returned to the power system when energy demand is high.

One such system appears in Peterson et al., U.S. Pat. No. 4,122,512. Peterson et al. uses a reversible alternating to direct current converter to convert the alternating current obtained from the AC power system into direct current for storage in a superconducting magnet and for converting the stored direct current into alternating current for return to the AC power system. This type of system, while providing for the efficient storage and return of energy to the AC power system, is not directed to supplying energy directly to loads.

Another superconducting energy storage system described in Higashino, U.S. Pat. No. 4,695,932, discloses an energy storage circuit which converts three-phase alternating current to direct current for storage in a superconducting energy storage coil. A DC capacitor and chopper circuit are used to control the amount of direct current in the superconducting energy storage coil. According to Higashino, this configuration allows the current capacity of the AC supply line equipment and the converter to be scaled down in accordance with service power established by the current rating of the coil, and also allows a reduction of operation losses.

These known superconducting energy storage systems provide for the efficient storage and return of energy to an electrical power system, but do not provide a means for disconnecting the power system from the loads which receive the power and supplying stored energy directly to the loads only. Such systems must therefore generate enough energy to support the entire power system and any loads connected thereto. This high level of support necessarily means that these superconducting energy storage systems must be fairly large not only in current and energy capacity but also in physical size.

Visser et al., U.S. Pat. No. 4,962,354, issued to Superconductivity, Inc. on Oct. 9, 1990, describes a superconductive voltage stabilizer. The superconductive voltage stabilizer comprises an AC/DC converter, a voltage regulator, an energy storage cell and a superconducting energy storage coil. Alternating current is converted to direct current and is stored in a superconducting energy storage coil. The stored direct current is released to an energy storage cell which in turn delivers the energy to a load. Energy is released in a controlled fashion according to the energy requirements of the load to thereby maintain the load's operation. This patent, U.S. Pat. No. 4,962,354, is incorporated herein by reference.

SUMMARY OF THE INVENTION

A shunt connected superconducting energy stabilizing system with isolation switching is coupled to an electrical power system or source line and to an AC or DC load or loads (load(s)) receiving energy from the electrical power system. The shunt connected superconducting energy stabilizing system stores energy in a superconducting inductive energy storage device and releases the energy to either the load or loads only or to both the load(s) and the electrical power system at the same time during voltage sags and power outages. The stored energy is available almost instantaneously to support either the energy requirements of the load(s) only or of the electrical power system and the load(s) simultaneously.

The isolation switch provides the means for isolating the load(s) from the utility system so that energy can be supplied only to the load(s) to continue operation or to enable the load(s) to "ride thru" the momentary voltage disturbance, thereby assisting the electrical power system in the recovery from the voltage sag or momentary outage by, in effect, shedding the load. This system also provides the means for delivering energy both to the loads and to the utility source by not operating the switch to allow the current to flow to the source of power and to the load(s).

When a voltage sag or momentary outage occurs, the shunt connected energy stabilizing system begins providing energy to the load(s) as soon as an isolation switch disconnects the utility source from the load(s). Disconnection of the load(s) from the source can be completed in a fraction of a millisecond because the isolation switch consists of thyristors that are reverse biased by the output of a DC to AC converter, and are naturally commutated to stay off once the disturbance has occurred. In case GTOs are used in the isolation switch instead of thyristors, the gating signal shall not be provided once the disturbance has occurred. When the source line comes back, the RPG/VC synchronizes its output with the source line and the isolation switch turns on.

Besides reacting quickly to supply energy to the loads and/or to the utility system, the shunt connected superconducting energy stabilizing system also performs consistently over a long period of time. The superconducting magnet employed herein is a rugged device which can be charged and discharged approximately once every minute or so depending on the size of the magnet. The useful life of the superconducting magnet is also quite long and can extend for at least up to a million charge/discharge cycles.

The shunt connected energy stabilizing system is also designed to provide backup energy to the utility system as well as to provide energy to the load(s). In this case, the thyristors are continuously fired so that the isolation switch directs energy both to the source and to the load(s).

A real power generator/voltamperes reactive (VAR) compensator (RPG/VC) provides not only real power to the load(s) and to the source line, but also provides continuous VAR support for the primary power source. The RPG/VC in the VAR compensation mode compensates load VAR changes of 100% leading to 100% lagging in less than one cycle.

During a voltage sag or momentary power outage, the RPG/VC receives energy from an energy backup and recovery system to provide real power to the load(s). The delivery of energy to the load(s) only is achieved through the use of the isolation switch. The isolation switch, in effect, sheds the load(s) from the line source during voltage sags or outages. Without the isolation switch, a superconducting energy storage device must not only support the load(s) but all devices connected to the power system including those which are causing the disturbance. Such large amounts of currents are required that the expense of such a system would be prohibitive. The relatively small size of superconducting magnet needed for the load-shedding application means that this system becomes economically feasible in situations that otherwise (without the switch) would be extremely costly due to the necessarily large superconducting magnet size. In addition, the superconducting magnet takes up a relatively small amount of physical space when compared to other devices used for storing energy, i.e., batteries.

DESCRIPTION OF THE PREFERRED EMBODIMENTS

Figure 1:
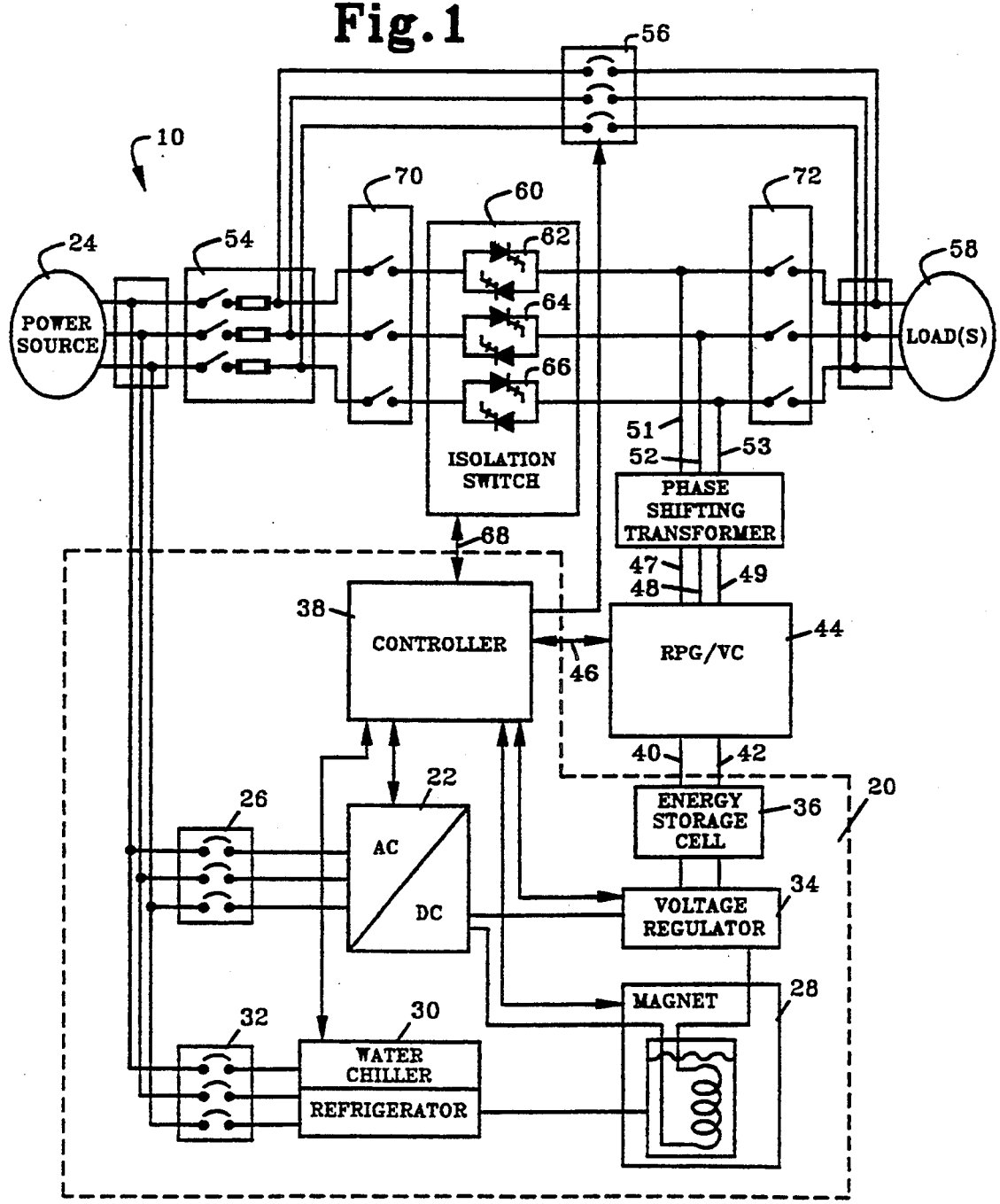
FIG. 1 is a schematic diagram of a shunt connected superconducting energy stabilizing system with an isolation switch in accordance with one embodiment of the present invention.

Referring now to FIG. 1, a shunt connected energy stabilizing system with isolation switching is shown generally by the numeral 10. The shunt connected energy stabilizing system includes a superconducting energy backup and recovery system 20 for storing and releasing energy to a load or plurality of loads and/or to an AC or DC power source. One type of superconducting energy backup and recovery system is described in Visser et al., U.S. Pat. No. 4,962,354. U.S. Pat. No. 4,962,354 is incorporated herein by reference.

The energy backup and recovery system 20 includes an AC/DC converter 22 coupled to a power source 24 through a plurality of magnetic circuit breakers 26. The AC/DC converter 22 receives three-phase power from the power source 24 and converts it to direct current for storage in a superconducting inductive energy storage device 28 or a superconducting magnet as would be understood by one skilled in the art. The plurality of circuit breakers 26 provide a means for disconnecting the AC/DC converter from the power source 24 for purposes of maintenance or testing.

A water chiller/refrigerator 30 is coupled to the power source 24 through another plurality of circuit breakers 32. The water chiller/refrigerator 30 contains refrigeration equipment for maintaining the temperature of the superconducting magnet 28 and a water chiller for cooling various high power electronics devices used in the superconducting energy stabilizer system.

The energy backup and recovery system 20 further includes a voltage regulator 34 which is coupled to the AC/DC converter 22 and to the superconducting magnet 28. The voltage regulator 34 controls the storage of energy in and the release of energy from the superconducting magnet 28. The voltage regulator 34 comprises a switching circuit which, when closed in this embodiment, stores energy in the superconducting magnet 28 and when opened releases energy from the superconducting magnet to an energy storage cell 36 coupled to the voltage regulator 34. The energy storage cell 36 stores energy received from the superconducting magnet 28 for the release of energy to the rest of the system. The energy storage cell can exist as a bank of capacitors, and can be incorporated as a part of the voltage regulator 34 or as part of a real power generator/VAR compensator discussed later in more detail.

A controller 38 comprising control circuitry controls the operation of the these components for storing and releasing energy. The AC/DC converter 22, the superconducting magnet 28 and the voltage regulator 34 are all coupled to the controller 38 through individual control lines which monitor the status of the various devices and which send control information thereto. While a single control line is illustrated, the number of control lines to each device varies as would be understood by one skilled in the art. The operation of these devices comprising the energy backup and recovery system 20 and the energy storage cell 36 is more fully explained in the previously cited issued patent.

The energy backup and recovery system 20 includes a pair of output lines 40 and 42 which are coupled to a real power generator/VAR compensator (RPG/VC) 44. A control line 46 is connected from the controller 38 to the RPG/VC 44 for monitoring and controlling the function of said device. The RPG/VC 44 is coupled by three output lines 47, 48, and 49 to a phase shifting transformer 50 which transmits energy stored in the energy storage cell 36 to the load(s) or to the utility source through lines 51, 52, and 53.

The RPG/VC 44 can generate real and reactive power. In the case of a voltage sag or momentary outage, the RPG/VC 44, powered by the energy backup and recovery system 20, provides real and reactive power to the load. During normal operation of the electrical power system, the RPG/VC 44 also generates reactive power or VAR compensation to provide continuous support of the power source 24. In this VAR compensation mode, VAR changes of 100% leading to 100% lagging load are compensated in less than a single cycle of the AC line.

The RPG/VC 44 includes inverters for converting the energy stored in the energy storage cell 36 to alternating currents as would be understood by one skilled in the art.

VAR compensation is accomplished by adjusting the phase shifting transformer 50 and the voltage level at the output of the inverter or inverters contained in the RPG/VC 44 (discussed later in the text and illustrated in FIGS. 4 and 5) so that the inverters provide an output voltage higher or lower than the voltage of the power source 24. Such an output provides leading or lagging VARs respectively.

The power source 24 is coupled to output lines 51, 52, and 53 of the phase shifting transformer 50 through a number of switches. An overcurrent protection switch 54 consists of three overcurrent protection devices coupled to each line of the three-phase power source. Coupled to the overcurrent protection switch 54 is an electro-mechanical maintenance bypass switch 56. The three-phase line is routed through the electro-mechanical maintenance bypass switch 56 directly to the load(s) 58. The electro-mechanical maintenance bypass switch 56 couples the power source directly to the load(s) to bypass the shunt connected energy stabilizing system during periods of maintenance or repair, and also during certain fault conditions on the load side.

An isolation switch 60 couples the power source 24 to the loads 58 and also couples the power source 24 to the lines 51, 52, and 53 of the phase shifting transformer 50. The isolation switch 60 comprises a first switch 62, a second switch 64, and a third switch 66 each of which couples one line of the three-phase line to the loads 58 and to the lines 51, 52, and 53 of the phase-shifting transformer 50. Each of the first, second, and third switches 62, 64, and 66 includes a pair of back to back semiconductor controlled rectifiers (thyristors or gate turn-off devices (GTOs)), illustrated here as GTOs, having their gates coupled to the controller 38 through a control line 68 illustrated here as a single line. The individual components of the isolation switch 60 are commercially available and have been used in other applications. One such use has been in uninterruptable power supply (UPS) applications, whereby the switch is normally open and only closed when the UPS fails which is similar to the operation of switch 56 in FIG. 1.

A first disconnect switch 70 and a second disconnect switch 72 are located on the three-phase line coupling the power source 24 to the loads 58. The first disconnect switch 70 is located between the overcurrent protection switch 54 and the isolation switch 60 while the second disconnect switch is located between the load 58 and the lines 51, 52, and 53 of the phase shifting transformer 50. Both switches are normally closed during operation of the superconducting energy stabilizing system. The switches 70 and 72 can either be controlled through the action of the controller 38 through control lines (not shown) or through mechanical operation as would be understood by one skilled in the art.

Isolation switch 60 operates in one of two modes. In a first mode, the isolation switch 60 causes the energy backup and recovery system 20, the RPG/VC 44 and the phase shifting transformer 50 to supply energy to only the load(s) by disconnecting the power source 24 from the load(s). In a second mode, the energy backup and recovery system 20 and the RPG/VC 44 and phase shifting transformer 50 provide energy to both the power source 24 and to the loads 58 simultaneously.

In the first mode, disconnection is completed in a fraction of a millisecond due to the nature of the devices incorporated in the switch 60. The GTOs in the first, second, and third switches 62, 64, and 66 are maintained in a state of reverse-bias caused by the voltage output of the RPG/VC 44 being higher than the power source. One skilled in the art would also understand that this switch can be constructed of semiconductor controlled rectifiers or thyristors. Then the switches are naturally commutated and stay off, thereby disconnecting the loads from the power source.

The use of the isolation switch 60 in the first mode makes it possible to use a relatively small magnet to supply energy to only the loads. The relatively small magnet, rated for example at 250 watt-hours, not only creates an economical design, but also takes up substantially less physical space than non-superconducting energy storage devices. During a voltage sag or outage, the superconducting magnet will carry the critical load only. The isolation switch 60 enables the inverters of the RPG/VC 44 to act as a real power generator by smoothly disconnecting the loads 58 from the source line which is sagging or has a momentary outage. Without the isolation switch 60, the RPG/VC 44 can not provide sufficient real power to the load if a small magnet is used and can also not provide a smooth transition between VAR and real power support.

The superconducting inductive energy storage device 28 carries the critical load during momentary voltage disturbances. The isolation switch 60 sheds the loads 58 from the power source 24. The reduction in both real power and VAR load will boost the voltage on the rest of the power system. This boost may be sufficient to keep other critical loads on this power system from shutting down, thereby enhancing the benefits of the shunt connected energy stabilizing system. Thus, not only does this system provide "ride-thru" for the load(s), but also provides voltage stabilization for the power system.

The relatively small magnet size needed for this application means that this system becomes economically feasible in situations that otherwise (without an isolation switch) are too costly because of the very large magnet required to support both line and load. The isolation switch allows the system to be scaled to provide energy in the kilowatt-hour range, if desired, instead of the megawatt-hour range required if both line and load are supported.

Figure 2:
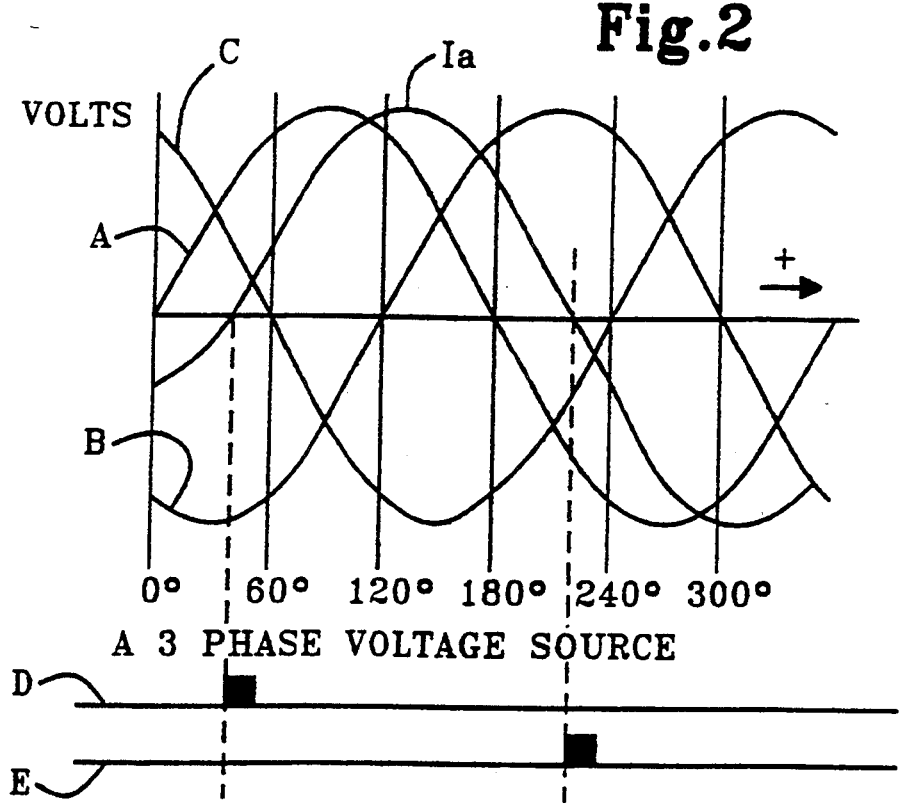
FIG. 2 is a timing diagram illustrating the relationship of the voltage waveforms of a three-phase voltage source, the line current of one of the voltage waveforms and the timing diagram of the gating of one pair of back to back thyristors when the power source is providing power to the loads.

FIG. 2 illustrates the synchronization of the firing of the thyristors with the three-phase voltage source. The top illustration of FIG. 2 shows the sinusoidal waveforms of each line of the three phase power source. Each waveform corresponds to the voltage of one phase of the three-phase line passing through each individual isolation switch 62, 64, and 66. Individual waveforms have been lettered A, B, and C and correspond respectively to voltages passing through the first switch 62, second switch 64 and third switch 66. The fourth sinusoidal waveform, Ia, represents the line current passing through the first switch 62 from the utility source 24 to the loads 58.

The gating of the thyristors of the first switch 62 is illustrated directly below the three-phase waveforms. As shown, the gating is synchronized with the line current and not the voltage. The upper illustrated thyristor of the first switch 62 is fired as shown at line D.

The bottom illustrated thyristor of the first switch 62 is fired as shown at line E. The remaining thyristors of the second and third isolation switches 64 and 66 are fired in a similar fashion as would be understood by one skilled in the art and in accordance with these teachings.

In the second mode, the system can supply energy to the source line as well as to the loads. In this case, the thyristors of the isolation switch 60 are continuously fired in such a way that the isolation switch reverses the source and the load. As a result, the energy backup and recovery system 20 backs up the load and the source simultaneously. When the power source 24 regains its normal operating mode, the RPG/VC 44 synchronizes its output to the source line, and then the isolation switch will reconnect the load to the source.

Figure 3:
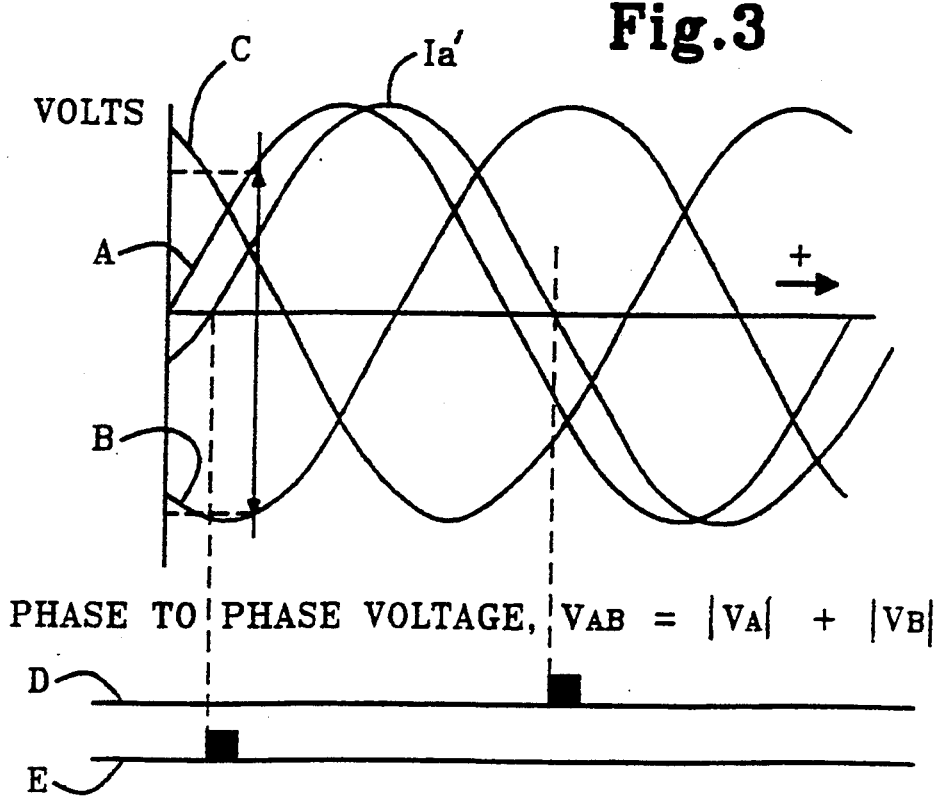
FIG. 3 is a timing diagram illustrating the relationship of the voltage waveforms of the three-phase voltage source, the line current of one of the voltage waveforms and the timing diagram of the gating of one pair of back to back thyristors when the superconducting energy stabilizing system is supplying energy both to the loads and to the source of power.

FIG. 3 illustrates the timing of the firing of the thyristors in the second mode. The labeling of the waveforms is the same as FIG. 2, except that a current Ia' is defined as the current flowing through the isolation switches from the energy backup and recovery system 20 to the power source 24. Thus, Ia' is in the reverse direction of Ia. As before, the gating of the thyristors is synchronized with the line current.

Figure 4:
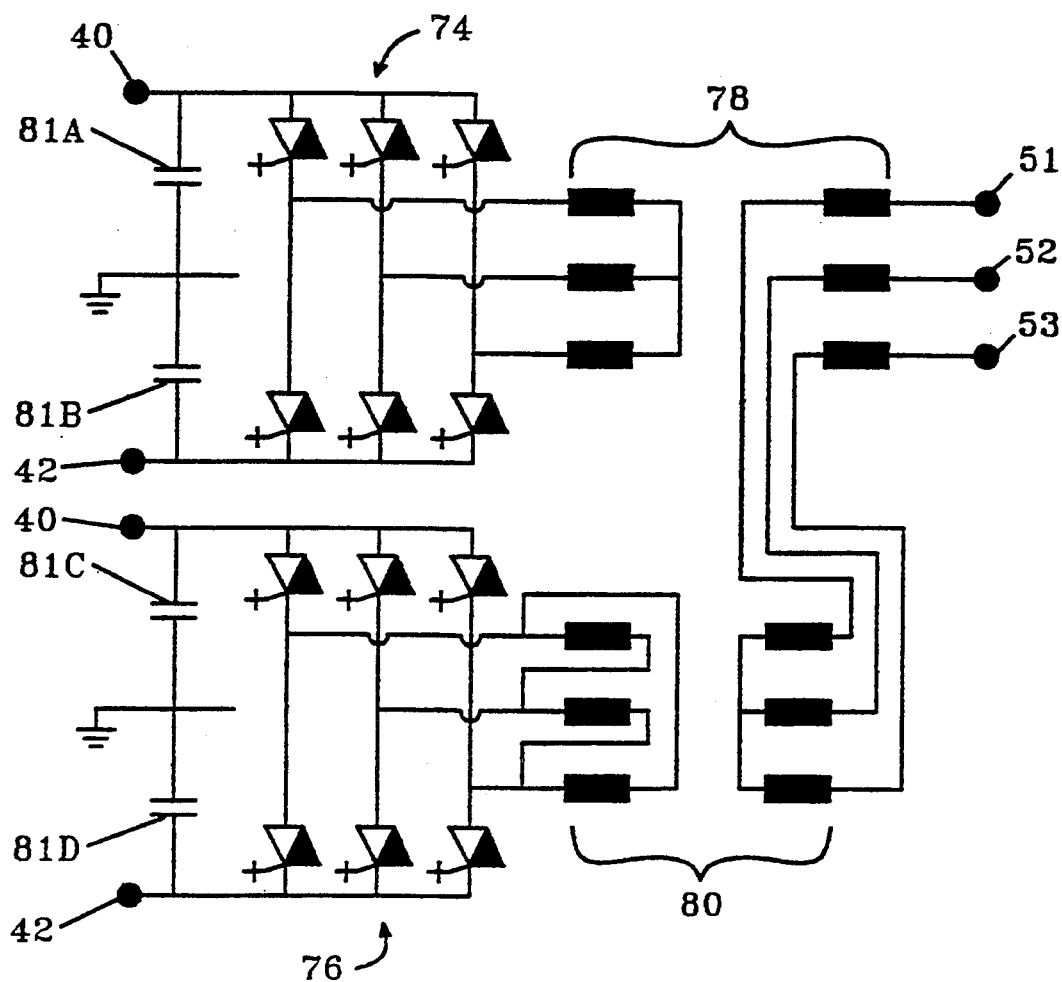
FIG. 4 is a schematic diagram of a VAR compensator.

The RPG/VC 44 provides an output voltage at a higher or lower value than the value of the line voltage to provide leading or lagging VARs respectively. As shown in FIG. 4, inverters 74 and 76 included in the RPG/VC 44 are adjusted in conjunction with phase shifting transformers 78 and 80 comprising the phase-shifting transformer 50 to provide the leading or lagging VARs. Under normal operating conditions, the capacitors of the energy storage cell 36, labeled 81 A-D, will be charged from the power source. The impedance (inductors or stray inductance of the phase shifting transformers 78 and 80 used at the output of the RPG/VC 44: normally 12 pulses or higher) should be large enough to limit di/dt for the switching devices and the transformer itself as well as to make reactive current controllable.

Figure 5:
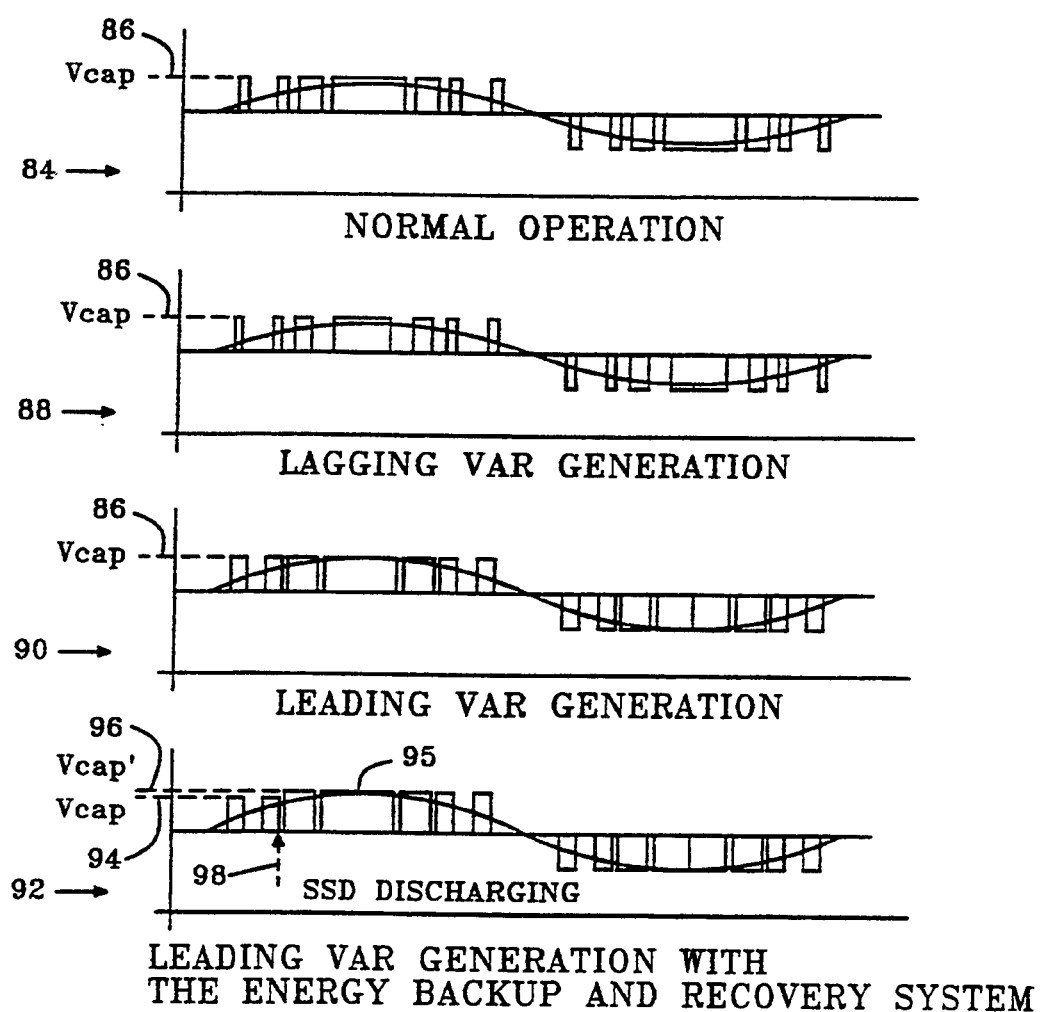
FIG. 5 is a timing diagram of pulse width modulation waveforms driving the inverters of the RPG/VC for both normal, leading and lagging operations with and without a superconducting energy backup and recovery system.

FIG. 5 illustrates pulse width modulation (PWM) waveforms used to drive the inverters of the RPG/VC 44. Providing a higher or lower voltage from the PWM inverters is accomplished by changing the pulse width of the switches contained in the inverters. In practical situations such as controlling arc furnaces, large motors, and other inductive loads as well as switching on and off VAR compensating capacitors, very quick changes (less than two to three milliseconds in duration) in VAR demand occur. Solid state switches used in high power (usually greater than 250 kW) inverters are not fast enough to respond to such a quick VAR change. In this case however, the energy backup and recovery system 20 charges the energy storage cell or capacitor bank to a desired value in a few milliseconds. Because the isolation switch enables relatively small magnets to be used, lower power inverters can also be used to thereby provide a quick response to VAR demand. The energy backup and recovery system 20 in conjunction with the pulse width modulation is, therefore, able to provide a highly responsive lagging to leading VAR support.

Waveforms 84, 88 and 90 illustrate the PWM waveform during normal operation of a standard VAR generator. The line 86 on the vertical axis of waveform 84 indicates the voltage level of a capacitor bank used for supplying energy to the loads through the operation of a standard VAR generator. Waveform 88 illustrates the PWM signal for a lagging VAR generation and waveform 90 illustrates the PWM signal for a leading VAR generation.

Waveform 92 illustrates leading VAR generation using the energy backup and recovery system 20 utilizing the superconducting inductive energy storage device 28. On the vertical axis, the voltage level of the energy storage cell is indicated. Line 94 indicates a given voltage level. When the load conditions change so that more VARs must be provided to the system, a standard VAR generator relying on energy supplied from the power source changes the PWM signal by increasing the duration of pulses or pulse width of the voltage waveform 95. However, load changes occur more rapidly than the response time of the PWM in the standard VAR generator. In contrast, the voltage of the capacitor bank 36 of the present invention is rapidly increased (shown by line 96 to V cap') by discharging the magnet 28 at time 98. Consequently, the RPG/VC 44 of the present invention responds more rapidly than the standard VAR generators previously mentioned.

The foregoing description of the invention has been presented for purposes of illustration and description. It is not intended to limit the invention to the precise forms disclosed, and many modifications and variations are possible in light of the above teachings.

What is claimed is:

1. An energy stabilizing system for stabilizing the supply of power from an AC electrical power system to a load in response to a power disturbance on said AC electrical power system, said energy stabilizing system comprising:

energy system means for converting AC power from said AC electrical power system to DC power for storage in a superconducting energy storage device and for allowing release of said DC power from said superconducting energy storage device in response to said power disturbance, said energy system means having input lines connected to receive said AC power from said AC electrical power system and output lines for supplying said DC power, said energy system means including control means for generating at least one power generation control signal and at least one isolation control signal;

a real power/reactive power means for generating an AC electrical power signal from said DC power on said output lines of said energy system means in response to said at least one power generation control signal, said real power/reactive power means having input lines receiving said DC power from said output lines of said energy system means and further having output lines connected to supply said AC electrical power signal to said load to reduce any effect of said power disturbance on said load;

a gated bidirectional semiconductor switch connected as an isolation switch between said AC electrical power system and said load and in a circuit branch that is parallel with said energy system means and said real power/reactive power means, said gated bidirectional semiconductor switch being responsive to at least one isolation control signal to either through-connect AC power from said AC power system to said load or to isolate said AC power system from said load, said at least one isolation control signal causing said gated bidirectional semiconductor switch to through-connect AC power from said AC electrical power system to said load during normal operation of said AC electrical power system and further being operational in either first or second modes upon the occurrence of a power disturbance, said at least one isolation control signal causing said gated bidirectional semiconductor switch to isolate said AC electrical power system from said load upon the occurrence of said power disturbance in said first mode, and causing said gated bidirectional semiconductor switch to through connect AC power from said energy system means and said real power/reactive power means to both said load and said AC power system in said second mode.

2. An energy stabilizing system as claimed in claim 1 wherein said at least one isolation control signal comprises a plurality of sequential gating pulses supplied to a gate input of said gated bidirectional semiconductor switch to allow through-connection of said AC power, said at least one isolation control signal going to a steady state to allow said gated bidirectional semiconductor switch to reverse commutate when said AC power system is to be isolated from said load.

3. An energy stabilizing system as claimed in claim 2 wherein said control means generates at least two isolation control signals and wherein said gated bidirectional semiconductor switch comprises a pair of anti-parallel silicon controlled rectifiers connected between said AC electrical power system and said load, said pair of anti-parallel silicon controlled rectifiers being responsive to said at least two isolation control signals.

4. An energy stabilizing system as claimed in claim 2 wherein said control means generates at least two isolation control signals and wherein said gated bidirectional semiconductor switch comprises a pair of anti-parallel thyristors connected between said AC electrical power system and said load, said pair of anti-parallel thyristors being responsive to said at least one isolation control signals.

5. An energy stabilizing system as claimed in claim 1 wherein said energy system means comprises:
 a superconducting magnet;
 cooling means for maintaining said superconducting magnet at a temperature at which said superconducting magnet remains superconducting;
 an energy storage cell having input lines and output lines;
 an AC-to-DC converter connected to receive AC power from said AC electrical power system and having a first output line connected to said superconducting magnet and a second output line;
 a voltage regulator having a first input line connected to said superconducting magnet, a second input line connected to said second output line of said AC-to-DC converter, and further having output lines connected to said input lines of said energy storage cell, said voltage regulator allowing said superconducting magnet to be charged by said AC-to-DC converter during normal operation of said AC electrical power system and allowing DC power stored in said superconducting magnet to charge said energy storage cell upon the occurrence of said power disturbance.

6. An energy stabilizing system as claimed in claim 5 wherein said energy storage cell comprises a plurality of capacitors connected to store energy received from said superconducting magnet at a voltage level determined by said voltage regulator.

7. An energy stabilizing circuit as claimed in claim 6 wherein said real power/reactive power means comprises:
 a pulse width modulated inverter circuit connected to receive DC power from said plurality of capacitors, said inverter circuit being responsive to said at least one power generation control signal to pulse width modulate the voltage on said plurality of capacitors;
 a phase shifting transformer having a primary connected to receive said pulse width modulated voltage from said pulse width modulated inverter circuit and a secondary connected to supply said AC electrical power signal.

8. An energy stabilizing system as claimed in claim 7 wherein said voltage regulator increases the voltage on said plurality of capacitors to generate leading VARs.

9. An energy stabilizing system for stabilizing the supply of power from an AC electrical power system to a load in response to a power disturbance on said AC electrical power system, said energy stabilizing system comprising:
 energy system means for converting AC power from said AC electrical power system to DC power for storage in a superconducting energy storage device and for releasing said DC power from said superconducting energy storage device in response to said power disturbance, said energy system means having input lines connected to receive said AC power from said AC electrical power system and output lines for supplying said DC power, said energy system means including control means for generating at least one power generation control signal and at least one isolation control signal, said control means having at least two modes of operation, said isolation control signal proceeding to an inactive state upon the occurrence of said power disturbance when said control means is in said first mode, said isolation control signal proceeding to an active state upon the occurrence of said power disturbance when said control means is in said second mode;
 a real power/reactive power means for generating an AC electrical power signal from said DC power on said output lines of said energy system means in response to said at least one power generation control signal, said real power/reactive power means having input lines receiving said DC power from said output lines of said energy system means and further having output lines connected to supply said AC electrical power signal to said load to reduce any effect of said power disturbance on said load;
 a gated bidirectional semiconductor switch connected as an isolation switch between said AC electrical power system and said load and in a circuit branch that is parallel with said energy system means and said real power/reactive power means, said gated bidirectional semiconductor switch being responsive to said at least one isolation control signal to through-connect AC power from said AC electrical power system to said load when said at least one isolation signal is in said active state and to isolate said AC electrical power system from said load when said at least one isolation control signal is in said inactive state.

10. An energy stabilizing system as claimed in claim 9 wherein said at least one isolation control signal comprises a plurality of sequential gating pulses supplied to a gate input of said gated bidirectional semiconductor switch to allow through-connection of said AC power, said at least one isolation control signal going to a steady state to allow said gated bidirectional semiconductor switch to reverse commutate when said AC power system is to be isolated from said load.

11. An energy stabilizing system as claimed in claim 10 wherein said control means generates at least two isolation control signals and wherein said gated bidirectional semiconductor switch comprises a pair of anti-parallel silicon controlled rectifiers connected between said AC electrical power system and said load, said pair of anti-parallel silicon controlled rectifiers being responsive to said at least two isolation control signals.

12. An energy stabilizing system as claimed in claim 10 wherein said control means generates at least two isolation control signals and wherein said gated bidirectional semiconductor switch comprises a pair of anti-parallel thyristors connected between said AC electrical power system and said load, said pair of anti-parallel thyristors being responsive to said at least two isolation control signals.

13. An energy stabilizing system as claimed in claim 9 wherein said energy system means comprises:
   a superconducting magnet;
   cooling means for maintaining said superconducting magnet at a temperature at which said superconducting magnet remains superconducting;
   an energy storage cell having input lines and output lines;
   an AC-to-DC converter connected to receive AC power from said AC electrical power system and having a first output line connected to said superconducting magnet and a second output line;
   a voltage regulator having a first input line connected to said superconducting magnet, a second input line connected to said second output line of said AC-to-DC converter, and further having output lines connected to said input lines of said energy storage cell, said voltage regulator allowing said superconducting magnet to be charged by said AC-to-DC converter during normal operation of said AC electrical power system and allowing DC power stored in said superconducting magnet to charge said energy storage cell upon the occurrence of said power disturbance.

14. An energy stabilizing system as claimed in claim 13 wherein said energy storage cell comprises a plurality of capacitors connected to store energy received from said superconducting magnet at a voltage level determined by said voltage regulator.

15. An energy stabilizing circuit as claimed in claim 14 wherein said real power/reactive power means comprises:
   a pulse width modulated inverter circuit connected to receive DC power from said plurality of capacitors, said inverter circuit being responsive to said at least one power generation control signal to pulse width modulate the voltage on said plurality of capacitors;
   a phase shifting transformer having a primary connected to receive said pulse width modulated voltage from said pulse width modulated inverter circuit and a secondary connected to supply said AC electrical power signal.

16. An energy stabilizing system as claimed in claim 15 wherein said voltage regulator increases the voltage on said plurality of capacitors to generate leading VARs.

17. An energy stabilizing system for stabilizing the supply of power from a three phase AC electrical power system to a load in response to a power disturbance on said three phase AC electrical power system, said energy stabilizing system comprising:
   energy system means for converting AC power received from said three phase AC electrical power system into DC power for storage in a superconducting energy storage device and for releasing said DC power from said superconducting energy storage device in response said power disturbance, said energy system means having input lines connected to receive said AC power from said three phase AC electrical power system and output lines for supplying said DC power, said energy system means including control means for generating at least one power generation control signal and a plurality of isolation control signals;
   a real power/reactive power means for generating three phase AC electrical power signals from said DC power received from said output lines of said energy system means in response to said at least one power generation control signal, said real power/reactive power means having input lines receiving said DC power from said output lines of said energy system means and further having output lines connected to supply said three phase AC electrical power signals to said load to reduce any effect of said power disturbance on said load;
   a plurality of gated bidirectional semiconductor switches each respectively connected as an isolation switch between a respective phase of said three phase AC electrical power system and said load and in a circuit branch that is parallel with said energy system means and said real power/reactive power means, each of said gated bidirectional semiconductor switches being responsive to at least one of said plurality of isolation control signals to either through-connect the respective phase of said three phase AC power system to said load or to isolate the respective phase of said three phase AC power system from said load, said plurality of isolation control signals causing said plurality of gated bidirectional semiconductor switches to through-connect AC power from said AC electrical power system to said load during normal operation of said AC electrical power system and further being operational in either first or second modes upon the occurrence of a power disturbance, said plurality of isolation control signals causing said plurality of gated bidirectional semiconductor switches to isolate said AC electrical power system from said load upon the occurrence of said power disturbance in said first mode, and causing said plurality of gated bidirectional semiconductor switches to through-connect AC power from said energy system means and said real power/reactive power means to both said load and said AC power system in said second mode.

18. An energy stabilizing system as claimed in claim 17 wherein said plurality of isolation control signals each comprise a plurality of sequential gating pulses supplied to a gate input of the respective gated bidirectional semiconductor switch to allow through-connection of the respective phase of said three phase AC electrical power system and said load, said plurality of isolation control signals going to a steady state to allow said gated bidirectional semiconductor switches to reverse commutate when said three phase AC electrical power system is to be isolated from said load.

19. An energy stabilizing system as claimed in claim 18 wherein said control means generates at least two isolation control signals for each one of said plurality of gated bidirectional semiconductor switches and wherein each of said plurality of gated bidirectional semiconductor switches comprises a pair of anti-parallel silicon controlled rectifiers connected between said AC electrical power system and said load, said pair of anti-parallel silicon controlled rectifiers being responsive to said at least two isolation control signals.

20. An energy stabilizing system as claimed in claim 18 wherein said control means generates at least two isolation control signals for each one of said plurality of gated bidirectional semiconductor switches and wherein each of said plurality of gated bidirectional semiconductor switches comprises a pair of anti-parallel thyristors connected between said AC electrical power system and said load, said pair of anti-parallel thyristors being responsive to said at least two isolation control signals.

21. An energy stabilizing system as claimed in claim 17 wherein said energy system means comprises:
a superconducting magnet;
cooling means for maintaining said superconducting magnet at a temperature at which said superconducting magnet remains superconducting;
an energy storage cell having input lines and output lines;
an AC-to-DC converter connected to receive AC power from said three phase AC electrical power system and having a first output line connected to said superconducting magnet and a second output line;
a voltage regulator having a first input line connected to said superconducting magnet, a second input line connected to said second output line of said AC-to-DC converter, and further having output lines connected to said input lines of said energy storage cell, said voltage regulator allowing said superconducting magnet to be charged by said AC-to-DC converter during normal operation of said three phase AC electrical power system and allowing DC power stored in said superconducting magnet to charge said energy storage cell upon the occurrence of said power disturbance.

22. An energy stabilizing system as claimed in claim 21 wherein said energy storage cell comprises a plurality of capacitors connected to store energy received from said superconducting magnet at a voltage level determined by said voltage regulator.

23. An energy stabilizing circuit as claimed in claim 22 wherein said real power/reactive power means comprises:
a pulse width modulated inverter circuit connected to receive DC power from said plurality of capacitors, said inverter circuit being responsive to said at least one power generation control signal to pulse width modulate the voltage on said plurality of capacitors;
a phase shifting transformer having a primary connected to receive said pulse width modulated voltage from said pulse width modulated inverter circuit and a secondary connected to supply said AC electrical power signal.

24. An energy stabilizing system as claimed in claim 23 wherein said voltage regulator increases the voltage on said plurality of capacitors to generate leading VARs.

* * * * *